Patented Apr. 14, 1925.

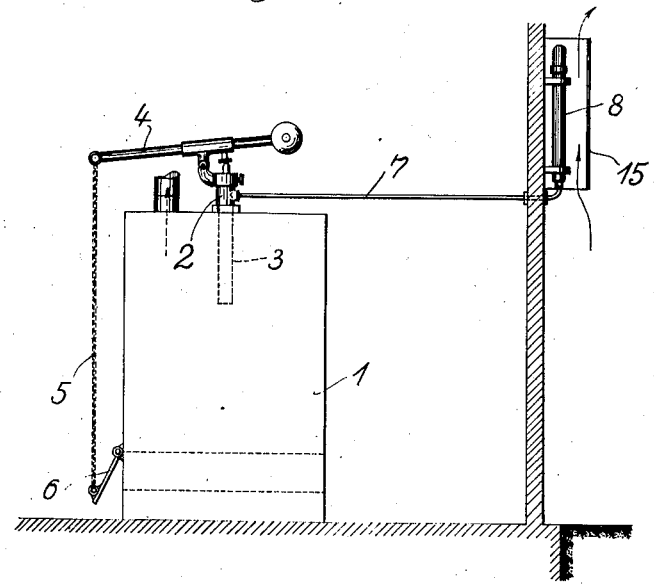

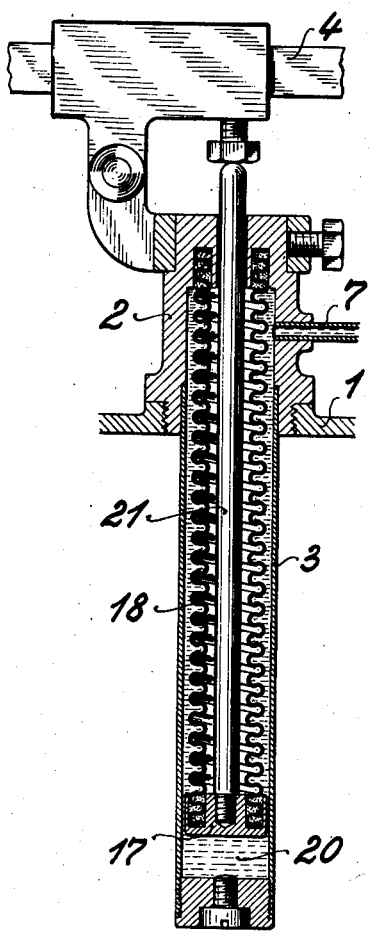
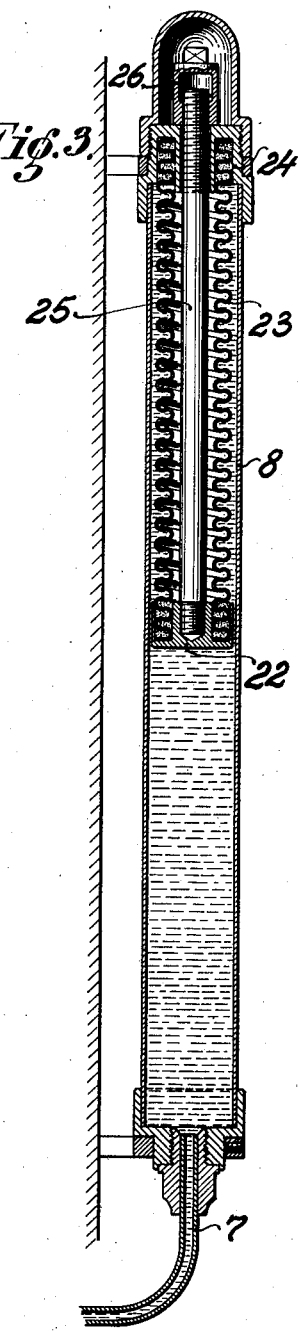

1,533,614

UNITED STATES PATENT OFFICE.

WILLY SANDVOSS, OF FRANKFORT-ON-THE-MAIN, GERMANY.

APPARATUS FOR REGULATING HEATING SYSTEMS.

Application filed December 27, 1921. Serial No. 525,211.

*To all whom it may concern:*

Be it known that I, WILLY SANDVOSS, a citizen of the German Republic, and residing at Frankfort-on-the-Main, in the German Republic, have invented certain new and useful Improvements in Apparatus for Regulating Heating Systems, of which the following is a specification.

My invention relates to improvements in apparatus for regulating heating systems, and more particularly in apparatus which are responsive to the temperature of the system for maintaining the same at the desired height. The object of the improvements is to provide automatic means for regulating the temperature in such a way that the heat developed in the system corresponds to the outdoor temperature, so that the rooms are supplied with the amount of heat required for keeping the same at the desired temperature. With this object in view my invention consists in providing a regulating apparatus which consists of two sections, one responsive to the temperature of the system and the other one to the outdoor temperature.

In order that my invention be more clearly understood two examples embodying the same have been shown in the accompanying drawing, in which—

Fig. 1, is a diagrammatical side view of a system in which the heat developed by the system is regulated by means of a valve provided in the flue of a boiler or the like and operated by the regulator by mechanical means, Fig. 2, is a detail sectional view showing the part of the temperature regulator connected with the boiler shown in Fig. 1, and Fig. 3, is a similar view showing the part of the regulator which is exposed to the outdoor temperature.

In the example shown in Fig. 1 the heating system comprises a boiler 1 which is equipped with a regulator having a head of any known or preferred construction. In the example shown in Figs. 1 and 2 the regulator comprises a head 2 threaded into the boiler, a cylindrical casing 3 closed all around and adapted to be fitted into the boiler, a piston 17 movable within the casing and connected to the head thereof by means of an expansible cylinder 18, a suitable fluid 19 responding to changes of temperature and confined within the casing and around the cylinder 18, and a piston rod 21 acting on a weighted lever 4. The expansion member controls a valve 6 provided in connection with the fireplace of the boiler, through the intermediary of the rocking lever 4 and a tension member 5, the connection being such that in case of a reduction of the temperature of the boiler the valve is opened and upon an increase of the temperature the valve is closed, so that the temperature is maintained constant. So far the regulating apparatus is known in the art. In order to change the temperature according to the outdoor temperature the receptacle 3 containing the expansion liquid communicates through a pipe 7 with a receptacle 8 containing an expansion liquid, which receptacle is located outside the room of the boiler and exposed to the outdoor temperature. As shown the receptacle 8 encloses a piston 22 connected by an expansible cylinder 23 to the upper head 24 of the receptacle. A rod 25 secured to the piston is passed through an axial bore of the head 24 and it has a nut 26 screwed to its end for setting the piston 22 in position against the spring action of the cylinder 23. If the outdoor temperature rises, a part of the expansion liquid is forced from the receptacle 8 and through the pipe 7 to the regulator 2, which therefore closes the valve 6 at a lower temperature within the boiler 1. Therefore the temperature within the boiler 1 is automatically reduced. If the outdoor temperature falls the operation is reversed, the expansion liquid flowing from the regulator 2 to the receptacle 8 the temperature of which is lower than before. Therefore the valve 6 is actuated at a higher temperature within the boiler. By means of the nut 26 the temperature at which the lever 4 is operated can be regulated.

Preferably the outdoor regulators are screened as against direct radiation by the sun and against the wind by a casing 15 enclosing the same.

By providing regulating apparatus of the proper effect the heating system can be operated at any desired temperature.

It will be understood that my improved apparatus can be used in connection with fire places of any type, the apparatus being adapted to control valves of any type such as slide valves, flap valves, and the like.

I claim:

In combination with a heater, a regulator including an exteriorly arranged head threaded into the heater, a casing arranged within the heater and carried by the head in communication therewith, means closing the inner end of the casing, a remotely arranged receptacle, a pipe establishing communication from the head, outwardly of the heater, to and through the bottom of the receptacle, a head for the receptacle, each head having its inner face formed with an axial bore and a concentrically arranged, annular recess, an expansible cylinder within the casing and the receptacle and secured at one end within the annular recess of the respective head, a closure for the opposite end of each expansible cylinder, a rod secured to each closure and guided through the bore of the respective head, and tensioning means on the outer end of the rod in the receptacle, the outer end of rod of the casing being designed to control the heater.

In testimony whereof I affix my signature in presence of two witnesses.

WILLY SANDVOSS.

Witnesses:
 ALFRED LEVINSKY,
 KARL SALLWEG.